United States Patent [19]

Kojovic

US005895979A

[11] Patent Number: 5,895,979
[45] Date of Patent: Apr. 20, 1999

[54] POWER DISTRIBUTION NETWORK INCORPORATING A VOLTAGE SUPPORT TRANSFORMER AND PROCESS OF USE

[76] Inventor: Ljubomir A. Kojovic, 2101 Circle Wood Dr., Racine, Wis. 53402

[21] Appl. No.: 08/935,604

[22] Filed: Sep. 23, 1997

[51] Int. Cl.[6] .................................................. G05F 3/04
[52] U.S. Cl. ........................ 307/17; 307/31; 323/247; 323/305; 327/190; 361/159; 336/155
[58] Field of Search .................................. 307/17, 11, 31; 361/159; 323/267, 328, 247, 305; 336/155, 173; 327/190; 326/26

[56] References Cited

U.S. PATENT DOCUMENTS

3,716,719  2/1973  Angelery et al. .................... 307/17
4,660,136  4/1987  Montorefano ....................... 323/267
4,661,882  4/1987  Presley ............................... 361/159
4,687,947  8/1987  Cobb ................................... 307/17

*Primary Examiner*—Albert W. Paladini
*Attorney, Agent, or Firm*—Amster Rothstein & Ebenstein

[57]  ABSTRACT

A power distribution network including a voltage support transformer is disclosed which uses the fault current from a line of the power distribution network in which a fault condition exists to support or stabilize the voltage across one or more other lines of the network connected to the same bus and seeing the same source impedance, to maintain the voltage in those lines substantially at the pre-fault levels. The voltage support or stabilization in the unfaulted line is based upon a current change due to the impedance change in the faulted line caused by the fault.

19 Claims, 7 Drawing Sheets

POWER DISTRIBUTION NETWORK INCORPORATING A VOLTAGE SUPPORT TRANSFORMER AND PROCESS OF USE

BACKGROUND OF THE INVENTION

1. Field of the Invention

The present invention relates to a process and device for limiting the effect of a fault condition in one line of a power distribution network on other power lines in the same network using a voltage support transformer.

2. Brief Description of the Related Art

U.S. Pat. No. 3,601,690, issued to Judson et al., describes a multi-coupler which employs a multiple filar-wound transformer. The multi-coupler receives power from a single power source and redistributes the power to a number of different loads. Any unbalancing load current between the various power lines feeding the different loads is reflected back into each transformer winding pair and dissipated through balance resistors which shunt each winding pair. Therefore, power is evenly distributed across to each load.

U.S. Pat. No. 3,657,728, issued to Mitsui et al., describes an interconnection apparatus with impedance insertion means for use in an electrical power system. The interconnection apparatus and impedance insertion means are used to instantaneously isolate one or more sections of the power system when there is a fault condition present, thus limiting the fault condition to the affected sections of the power distribution section.

U.S. Pat. No. 3,935,471, issued to Bishop et al., describes a current limiting power supply in which a plurality of loads are isolated from each other with a saturating transformer and a series inductor, such that each load can be shorted without affecting the operation of any other load.

Prior systems, however, fail to adequately reduce the effects of a power perturbation in a power distribution network on unperturbed lines.

It is therefore an object of the present invention to provide a voltage and current support in unperturbed, e.g., unfaulted, lines of a power distribution network during a perturbation, e.g., fault, in one line supplied from the same power source.

It is therefore also an object of the present invention to reduce the effects voltage or current perturbations, e.g., fault conditions, have on unperturbed lines of a power distribution network.

It is yet another object of the present invention to provide a voltage transformer and distribution system which can be designed for smaller current stresses and with lower design and production costs.

It is yet another object of the present invention to protect important or sensitive loads on a power distribution network from the effects of a fault or other power perturbation within the network.

SUMMARY OF THE INVENTION

The delivery of consistent and high quality power is a very important aspect of power distribution networks. Accordingly, the prevention or control of power surges and interruptions within a power distribution network is extremely important, such that customers receive an uninterruptable power supply. However, there is a high probability that there will exist at some time a fault on one of several lines of a power distribution network, wherein the fault can adversely cause voltage reduction (voltage sag) on the other lines connected to the same bus and seeing the same source impedance.

A voltage support transformer used in accordance with the present invention reduces or eliminates the effects of a perturbation, e.g., a fault condition, on non-fault lines of a power distribution network.

In accordance with the foregoing objectives, the present invention provides a power distribution network which includes a power source, first and second power distribution lines in communication with the source for connection with first and second loads, a first voltage support transformer including first and second windings, the first winding in series with the first line, the second winding in series with the second line, the first voltage support transformer substantially maintaining the voltage across either of the first and second lines when a power perturbation occurs in the other of the first and second lines.

In accordance with the foregoing objectives, the present invention provides, in a power distribution network, a process for supporting a voltage across or a current through a first line in said power distribution network in the event of a voltage or current perturbation in a second line in said power distribution network, comprising the steps of connecting a voltage support transformer including first and second windings to first and second lines in a power distribution network, the first winding in series with the first line and the second winding in series with the second line, and supporting a voltage across the second line through the voltage support transformer by inducing a voltage across the second winding caused by the current in the first winding.

The invention will be more fully understood with reference to the following detailed description of the invention and drawing figures.

BRIEF DESCRIPTION OF THE DRAWINGS

FIG. 8 is an illustration of a graph of the fault current in a portion of the prior art power distribution network illustrated in FIG. 7a;

FIG. 9 is an illustration of a graph of the fault voltage in another portion of the prior art power distribution network illustrated in FIG. 7a;

DESCRIPTION OF THE PREFERRED EMBODIMENTS

A voltage support transformer (VST) according to the present invention uses a change in current from a line of a power distribution network in which a fault condition or other power perturbation exists to create a voltage change in one or more other lines of the network connected to the same bus and seeing the same source impedance, to maintain or support the voltage in those lines at or near pre-perturbation levels. The voltage correction in the unperturbed line(s) is (are) thus based upon current change due to the impedance change in the faulted line.

According to an exemplary embodiment of the present invention, a single-phase non-saturable voltage support transformer includes a primary and a secondary winding wherein the primary and secondary windings are each connected in series with separate loads on separate lines of a power distribution network. The VST is designed mainly for installation in substations, although it may also be installed downline from a substation to better protect important or sensitive loads. In the context of the present invention, an important or sensitive load refers to a load which has little tolerance for power fluctuations.

Figure 1:
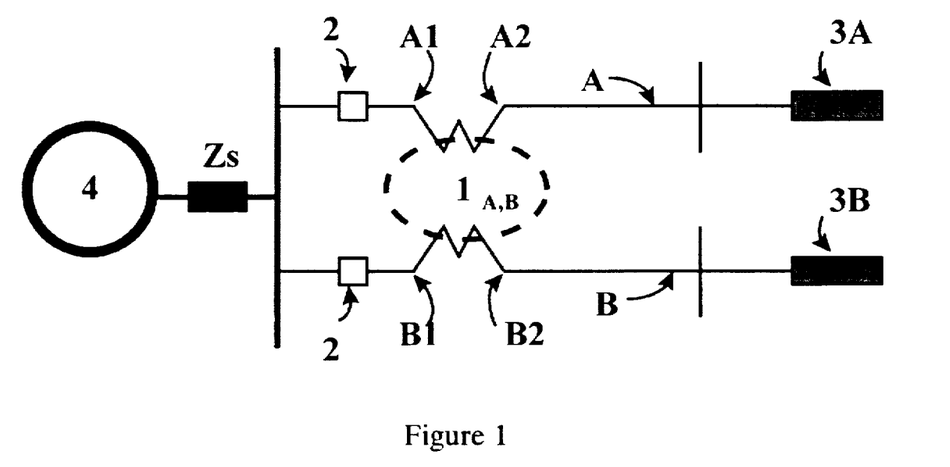
FIG. 1 is a schematic view of one embodiment of a power distribution network including a non-saturable voltage support transformer according to the present invention.

FIG. 1 illustrates a single-line representation of a power distribution network including one VST $1_{A,B}$ per phase according to the above-identified exemplary embodiment. As stated, VST $1_{A,B}$ is a single-phase, non-saturable transformer. Each of the windings of VST $1_{A,B}$ is connected in each phase in series with load $3_A$ or $3_B$ through lines A or B, respectively. Reclosers 2 may be provided in series with the windings of VST $1_{A,B}$ as illustrated. Reclosers 2 are illustrated as being upstream of VST $1_{A,B}$, but may be located downstream of the VST $1_{A,B}$. A power supply source 4 is located in series with and upstream of VST $1_{A,B}$ for supplying power to loads $3_A$ and $3_B$.

If no VST $1_{A,B}$ is installed between lines A and B as shown in FIG. 1, and if a fault condition occurs on one line of the power distribution network, for example, an overcurrent condition on line B, fault current would flow through source impedance Zs and through line B. This overcurrent in line B would cause a voltage drop in the source impedance Zs which would cause a voltage reduction on line A and the load 3A would experience voltage reduction (voltage sag), even though no fault exists on line A. Stated differently, an overcurrent in line B will adversely affect the voltage and current being supplied to the non-faulted line A. More specifically, line A, and load $3_A$ connected to line A, are likely to experience a corresponding voltage reduction (voltage sag).

If, however, a VST $1_{A,B}$ is installed between line A and line B as shown in FIG. 1, and if a fault condition, such as an overcurrent condition, occurs on one line of the power distribution network, for example single-phase-to-ground fault on line B, fault current would flow through source impedance Zs, through line B, and through the B1-B2 winding of VST $1_{A,B}$ which is connected in series with line B (B1, B2 represent VST $1_{A,B}$ winding terminals of the winding connected in series with line B). Overcurrent which flows through B1–B2 winding would induce a support voltage in A1–A2 winding of VST $1_{A,B}$, which is connected in series with line A. This induced voltage would maintain and support the voltage and current realized by load $3_A$ at or near pre-fault condition levels. Accordingly, load $3_A$ will experience substantially unchanged voltage and current during the power perturbation (see FIG. 11). At the same time, the fault current on line B will be suppressed (see FIG. 10) by the VST's own intrinsic and increased impedance during the fault condition.

Figure 2:
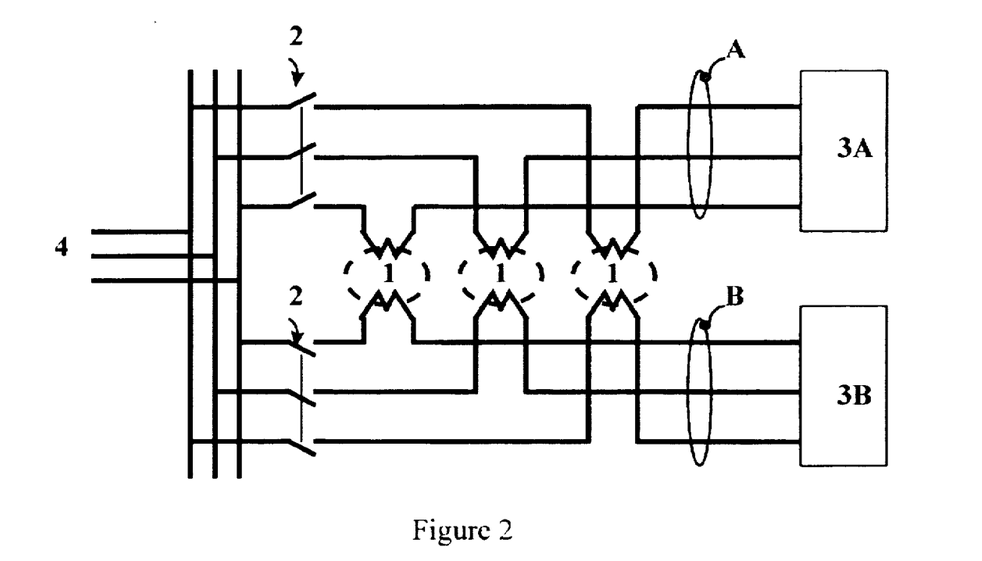
FIG. 2 is a schematic view of a second embodiment of a power distribution network including a voltage support transformer according to the present invention.

FIG. 2 illustrates another exemplary embodiment of the present invention, wherein three VSTs $1_{A,B}$ are shown connected in three phases of a 3-phase power distribution network comprising two 3-phase lines, A and B. With respect to each individual phase line, the operation of the exemplary embodiment illustrated in FIG. 2 is substantially similar to that of the embodiment illustrated in FIG. 1.

Figure 3A:
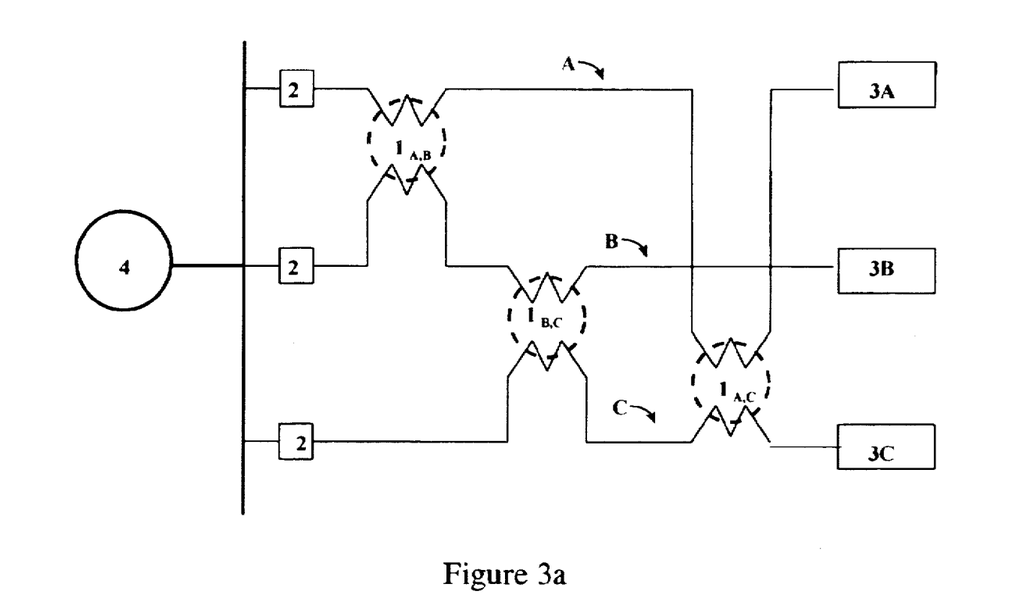
FIG. 3a is a schematic view of a third embodiment of a power distribution network including a voltage support transformer according to the present invention.

FIG. 3A illustrates a single-line representation of a power distribution network including VST $1_{A,B}$, VST $1_{B,C}$, and VST $1_{A,C}$ in accordance with a third exemplary embodiment of the present invention, wherein the network includes line A, line B, and line C. Each phase of the power distribution lines A, B, and C are in series with one of the windings of two of the three VSTs 1 per phase. For example, line A is in series with a winding of both VST $1_{A,B}$ and VST $1_{A,C}$. Thus, each phase of lines A, B, and C is supported in the event there is a fault condition on one or more of the other two lines.

Figure 3B:
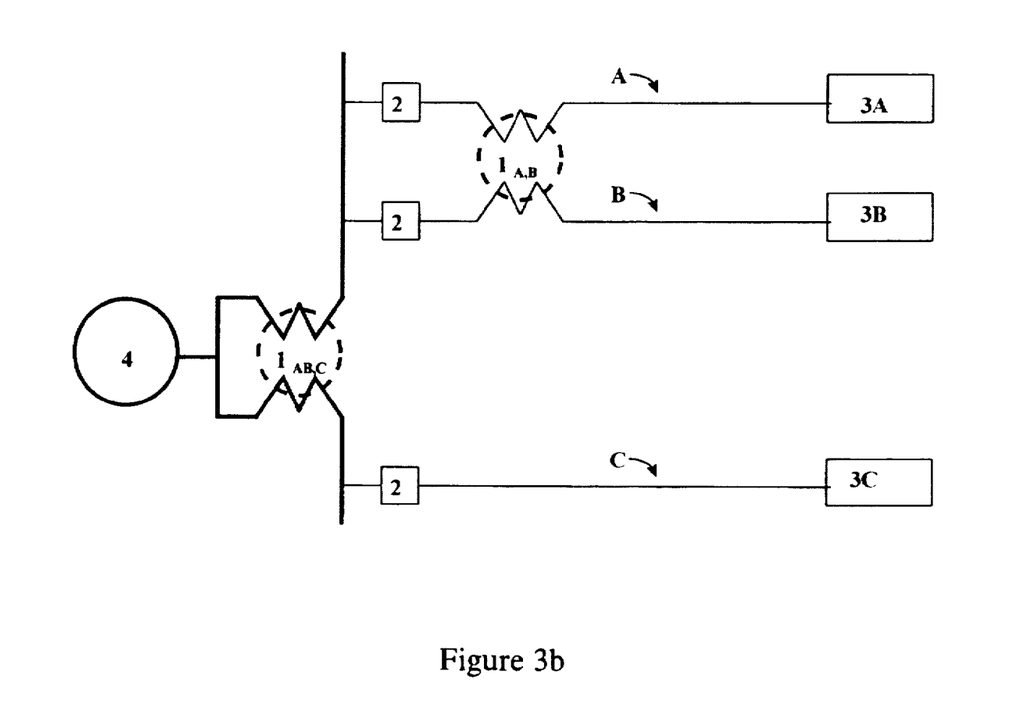
FIG. 3b is a schematic view of a fourth embodiment of a power distribution network including a voltage support transformer according to the present invention.

FIG. 3B illustrates a single-line representation of a power distribution network including two VSTs per phase in accordance with a fourth exemplary embodiment of the present invention, wherein the network again includes three lines A, B, and C. Like the embodiment shown in FIG. 3A, lines A and B as shown in FIG. 3B are mutually supported by VST $1_{A,B}$. However, line C is separately supported by VST $1_{AB,C}$.

The exemplary embodiment illustrated in FIG. 3B is potentially more cost effective than the exemplary embodiment illustrated in FIG. 3A, because only two VSTs per phase are required in the embodiment illustrated in FIG. 3B. The VSTs required in the embodiment illustrated in FIG. 3A, however, have the same design, while the VSTs in the embodiment illustrated in FIG. 3B have different designs, which may dictate the use of the embodiment of FIG. 3A in some applications.

Figure 4:
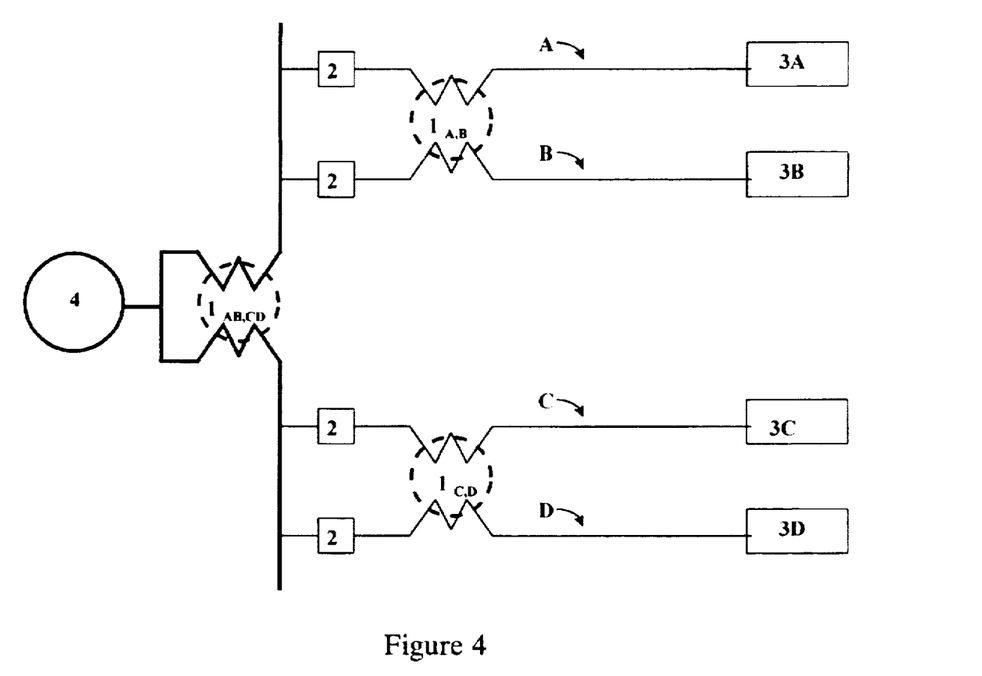
FIG. 4 is a schematic view of a fifth embodiment of a power distribution network including a voltage support transformer according to the present invention.

FIG. 4 illustrates a power distribution network including three VSTs per phase in accordance with a fifth exemplary embodiment of the present invention, wherein the network includes four lines A, B, C, and D. In FIG. 4, VST $1_{A,B}$ mutually supports lines A and B; VST $1_{C,D}$ mutually supports lines C and D. VST $1_{AB,CD}$, however, supports both lines A and B for faults on line C and/or D and supports both lines C and D for faults on line A and/or B. In the event of a power perturbation on one of lines A, B, C, and D, a support voltage is induced on the other lines through the three VSTs, thus supporting the voltages across and currents through these lines. For example, in the event of a power perturbation on line A, a support voltage is induced on line B through the windings of VST $1_{A,B}$, thus stabilizing the voltage across and current through line B. The same power perturbation induces a support voltage and current through VST $1_{AB,CD}$, stabilizing the voltage across and current through lines C and D.

Figure 5:
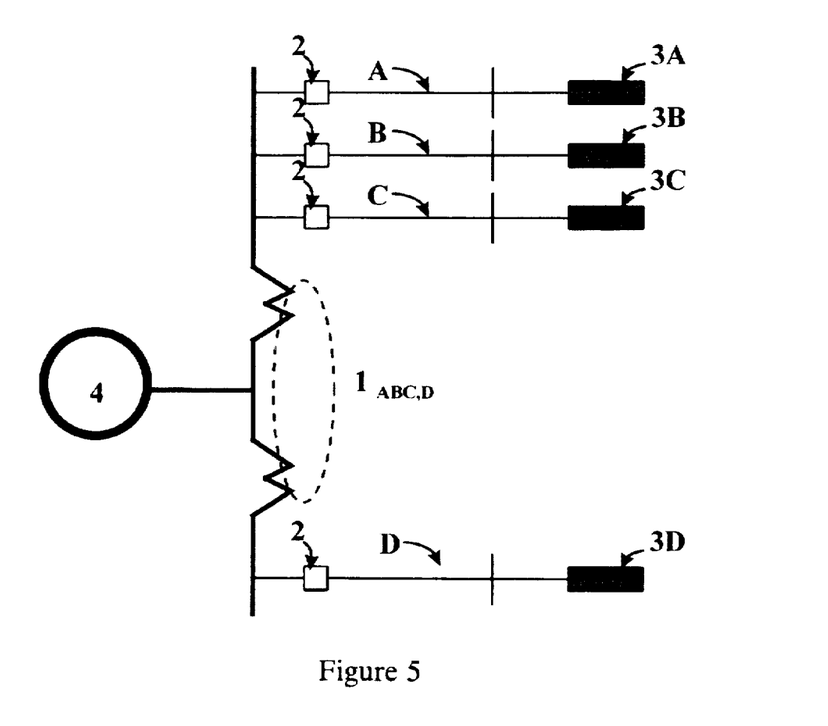
FIG. 5 is a schematic view of a sixth embodiment of a power distribution network including a voltage support transformer according to the present invention.

FIG. 5 illustrates a single-line representation of a power distribution network in accordance with a sixth exemplary embodiment of the present invention, wherein the network includes four lines, A, B, C, and D as well as one VST $1_{ABC\_D}$ per phase. In FIG. 5, an important or sensitive load 3D is fed by line D. For faults on lines A, B, and C, line D containing sensitive load is supported by VST $1_{ABC\_D}$. However, for faults on one of lines A, B, or C, other two lines A, B, or C are not supported. The exemplary embodiment illustrated in FIG. 5 is potentially more cost effective than the exemplary embodiment illustrated in FIG. 4, because only one VSTs per phase is required in the embodiment illustrated in FIG. 5 and is applicable if sensitive load is located on one line only. Alternatively, lines A, B, and C may include VSTs (not shown) to mutually support each other in a manner similar to lines A, B, C, and D illustrated in FIG. 4. In the event of a power perturbation on one of the lines A, B, C, and D, a support voltage is induced on line D trough VST $1_{ABC\_D}$, thus supporting the voltage across and current through line D. For example, in the event of a power perturbation on line A, a support voltage is induced on line D through the windings of VST $1_{ABC\_D}$, thus stabilizing the voltage across line D and the current supplied to load 3D.

Figure 6:
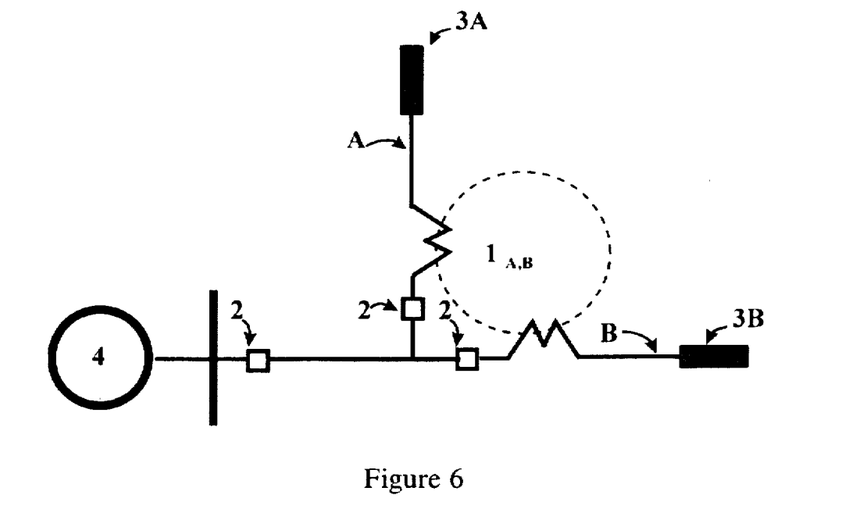
FIG. 6 is a schematic view of a seventh embodiment of a power distribution network including a voltage support transformer according to the present invention.

FIG. 6 illustrates a single-line representation of a power distribution network in accordance with a seventh exemplary embodiment of the present invention, wherein the network includes two lines A and B, and one VST $1_{A,B}$ per phase.

Figure 7A:
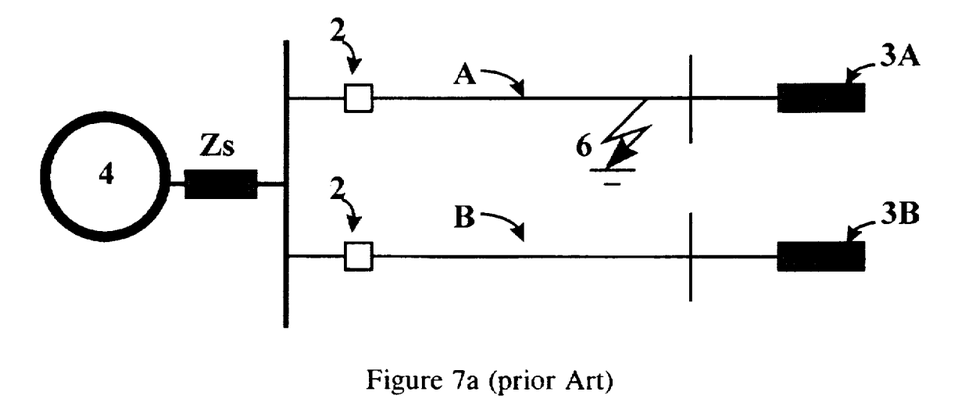
FIG. 7a is a schematic view of a prior art power distribution network experiencing a fault condition.
Figure 8:
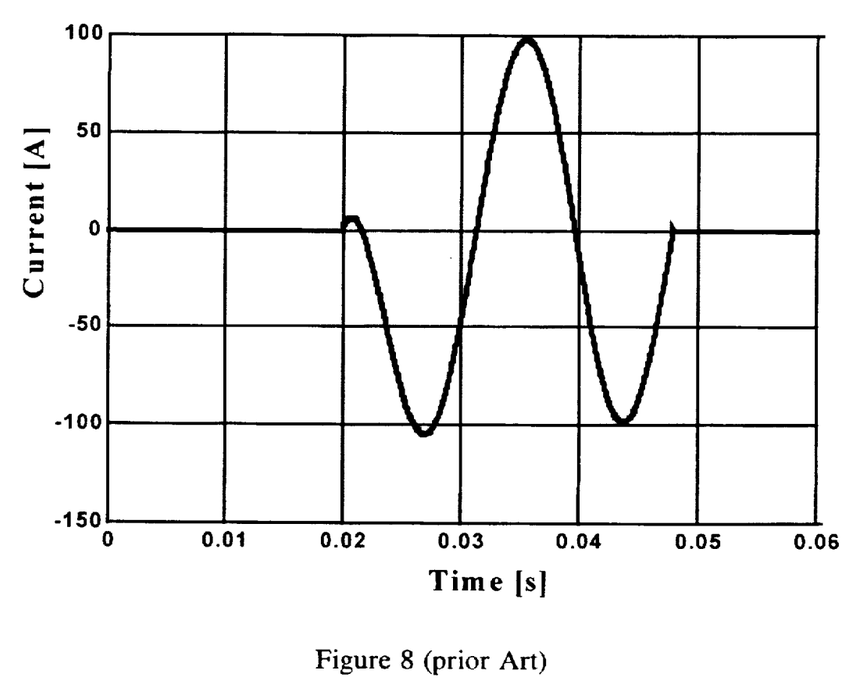

FIG. 7A illustrates a single-phase, two-line, two-load network configuration in accordance with the prior art. FIG. 7A also indicates the occurrence of a fault 6 on line A. FIG. 8 illustrates a graphical representation of the exemplary current on line A of FIG. 7A in accordance with the prior art. As can be readily appreciated from FIG. 8, a fault initiated at about time 0.02 seconds generates overcurrent, lasts 1.5 cycles and returns to steady state at about time 0.05 seconds.

Figure 9:
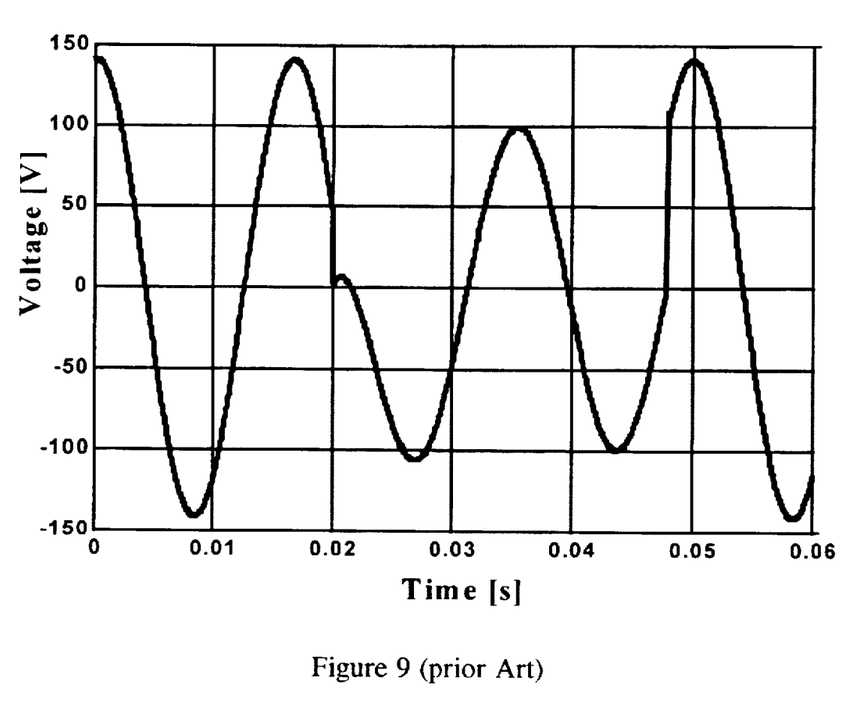

FIG. 9 illustrates the exemplary voltage magnitudes on unfaulted line B of FIG. 7A during the fault 6. As can be readily appreciated from FIG. 9, the voltage magnitude appears reduced 30% of the pre fault voltage magnitude during the fault. Voltage reduction can be much higher than shown in this example and depends of system impedance and line parameters. This reduction of the voltage magnitude caused, for example, by the fault condition on line A of FIG. 7A, is highly undesirable.

Figure 7B:
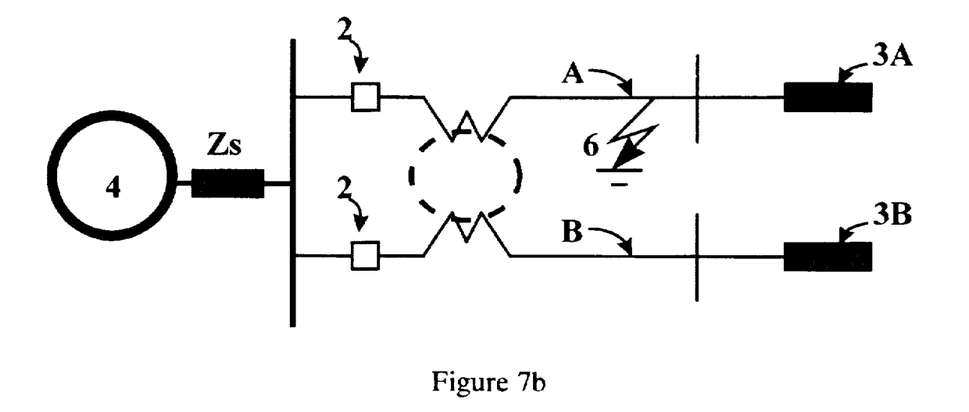
FIG. 7b is a schematic view of a power distribution network similar to that illustrated in FIG. 7a, but including a voltage support transformer according to the present invention.
Figure 10:
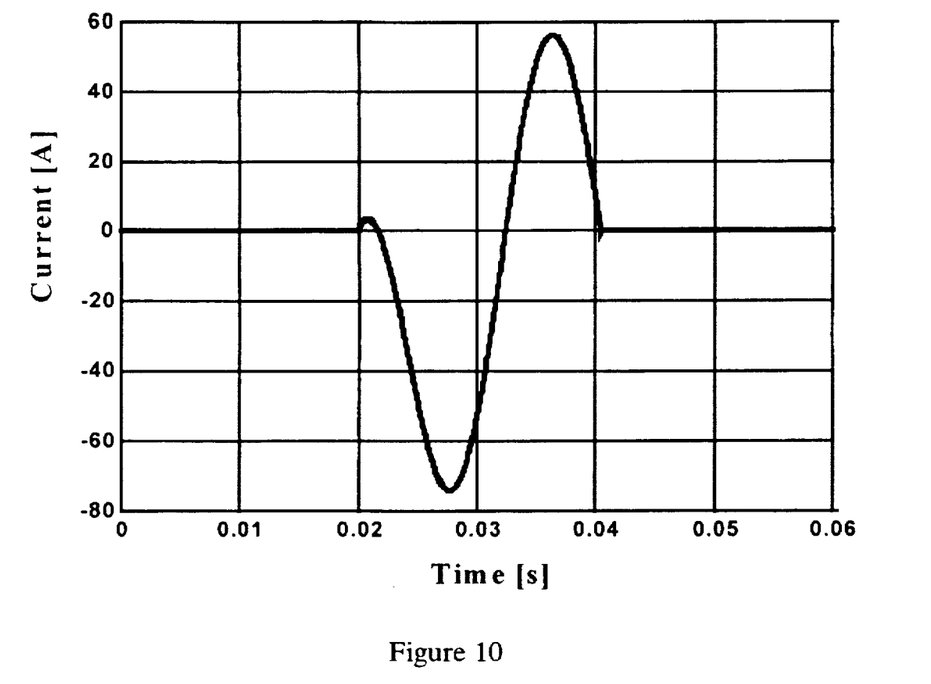
FIG. 10 is an illustration of a graph, similar to that illustrated in FIG. 8, of the fault current in a portion of the power distribution network illustrated in FIG. 7b.

FIG. 7B illustrates a single-phase, two-line, two-load embodiment in accordance with the first exemplary embodiment of the present invention, with the occurrence of a fault condition 6 on line A. FIG. 10 illustrates the exemplary fault current magnitude on line A. As can be readily appreciated from FIG. 10, especially when compared with the prior art illustrated in FIG. 8, fluctuation in the line current is significantly less in magnitude than for the prior art power distribution network.

Figure 11:
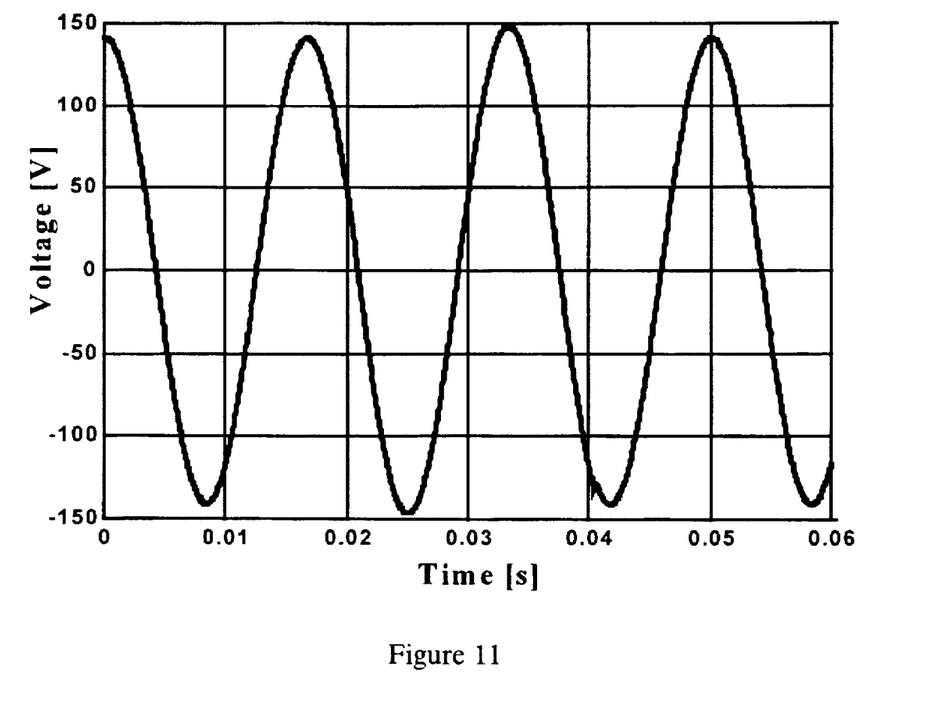
FIG. 11 is an illustration of a graph, similar to that illustrated in FIG. 9, of the fault voltage in another portion of the power distribution network illustrated in FIG. 7b.

FIG. 11 illustrates the exemplary voltage magnitudes across unfaulted line B of FIG. 7B during the fault on line A. As can be readily appreciated from FIG. 11, especially when compared with the prior art illustrated in FIG. 9, the voltage magnitude remains substantially unchanged.

Figure 12:
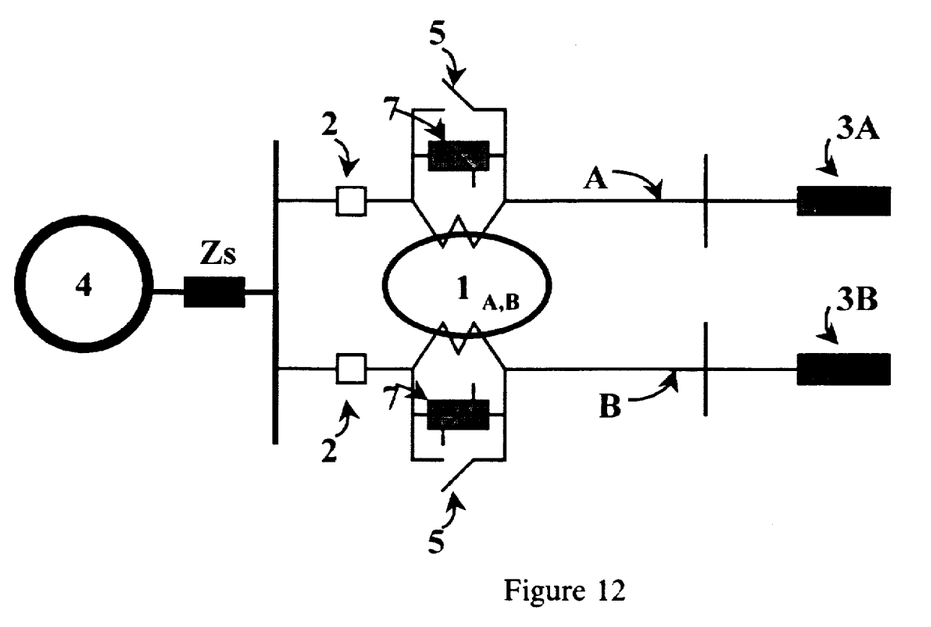
FIG. 12 is a schematic view of a eighth embodiment of a power distribution network including a saturable voltage support transformer according to the present invention.

According to yet another embodiment of the present invention, the voltage support transformer can also be designed as a single-phase saturable transformer with arresters 7 (metal oxide varistors MOVs) and by-pass switches 5 (mechanical or solid-state) connected in parallel with both windings of the voltage support transformer as shown in FIG. 12. The voltage support transformer of the embodiment illustrated in FIG. 12 supports voltage of unfaulted lines in the same way as described in the previously embodiments.

Saturable voltage transformer $1_{A,B}$ is constructed to saturate when the system voltage on an unfaulted lines is recovered to 100%. MOVs 7 provide overvoltage protection to the lines A, B caused by the saturable voltage support transformer. By-pass switches 5 will close in case that fault lasts to long, to prevent MOV 7 overheating. This exemplary embodiment is potentially less cost effective than non-saturable voltage support transformers.

A power distribution network according to the various embodiments of the present invention may be constructed less expensively than prior art networks, because each line of the network no longer needs to be as robust as with prior networks. Because the use of VSTs in the present invention greatly reduce the stresses on network components by supporting voltages in unperturbed lines and suppressing voltage changes on perturbed lines, network components can be designed to accommodate fewer stresses, and therefore less expensively.

While the invention has been described in detail with reference to preferred embodiments thereof, it will be apparent to one skilled in the art that various changes can be made, and equivalents employed, without departing from the scope of the invention.

What is claimed is:

1. A power distribution network, comprising:
   a power source;
   a first power distribution line in communication with said power source for connection with a first load;
   a second power distribution line in communication with said power source for connection with a second load;
   a first transformer including first and second windings, said first winding in series with said first line, said second winding in series with said second line, said first transformer substantially maintaining the voltage across either of said first and second lines when a power perturbation occurs in the other of said first and second lines.

2. A power distribution network according to claim 1, wherein said first transformer comprises a single-phase, non-saturable voltage support transformer.

3. A power distribution network according to claim 1, further comprising a first recloser in series with said first winding and a second recloser in series with said second winding.

4. A power distribution network according to claim 1, wherein said first and second lines are connected to the same bus and seeing the same source impedance.

5. A power distribution network according to claim 1, further comprising a third power distribution line, a second transformer, and a third transformer, said second and third transformers each including first and second windings, said second transformer first winding in series with said first transformer second winding, said second transformer second winding in series with said third line and said third transformer second winding, and said third transformer first winding in series with said first transformer first winding.

6. A power distribution network according to claim 1, further comprising a third power distribution line and a second transformer, said second transformer including first and second windings, said first and second lines being connected to said first and second loads, said second transformer first winding being in series with said first and second lines, said second transformer second winding being in series with said third line.

7. A power distribution network according to claim 1, further comprising a third power distribution line, a fourth power distribution line, a second transformer, and a third transformer, said second transformer including first and second windings, said first and second lines being connected to said first and second loads, said third and fourth lines being connected to said third and fourth loads, said third transformer first winding being in series with said first and second lines, said second transformer second winding being in series with said third and fourth lines.

8. A power distribution network according to claim 7, further comprising a third transformer, said third transformer including first and second windings, said third transformer first winding in series with said third line, said third transformer second winding in series with said fourth line.

9. A power distribution network according to claim 1, further comprising third and fourth power distribution lines, said first transformer first winding in series with said first, third and fourth lines.

10. A power distribution network according to claim 1, wherein said first transformer comprises a single-phase, saturable voltage support transformer with two windings and first and second bypass switches, and first and second arresters, said first bypass switch and said first arrester in parallel with said first transformer first winding, and said second bypass switch and second arrester in parallel with said first transformer second winding.

11. A power distribution network, comprising:

a three-phase power source;

a first three-phase power distribution line in communication with said power source for connection with a first load;

a second three-phase power distribution line in communication with said power source for connection with a second load;

a first transformer including first and second windings, said first winding in series with a first phase of said first line, said second winding in series with a first phase of said second line, said first transformer substantially maintaining the voltage across either of said first phases of said first and second lines when a power perturbation occurs in the other of said first phases of said first and second lines.

12. A power distribution network according to claim 11, wherein said first transformer comprises a single-phase, non-saturable voltage support transformer.

13. A power distribution network according to claim 11, further comprising:

a second transformer including first and second windings, said first winding in series with a second phase of said first line, said second winding in series with a second phase of said second line, said second transformer substantially maintaining the voltage across either of said second phases of said first and second lines when a power perturbation occurs in the other of said second phases of said first and second lines; and a third transformer including first and second windings, said first winding in series with a third phase of said first line, said second winding in series with a third phase of said second line, said third transformer substantially maintaining the voltage across either of said third phases of said first and second lines when a power perturbation occurs in the other of said third phases of said first and second lines.

14. In a power distribution network, a process for supporting a voltage across or a current through a first line in said power distribution network in the event of a voltage or current perturbation in a second line in said power distribution network, comprising the steps of:

connecting a voltage support transformer including first and second windings to first and second lines in a power distribution network, said first winding in series with said first line and said second winding in series with said second line;

supporting a voltage across said second line through said voltage support transformer by inducing a voltage across said second winding using the current in said first winding.

15. In a power distribution network including a power source, a first load, a first power distribution line connecting said power source with said first load, a second load, and a second power distribution line connecting said power source with said second load, a process for stabilizing the power distribution in said network, comprising the steps of:

changing a current through a first winding of a transformer in series with said first power distribution line in response to a fault condition on said first power distribution line;

inducing voltage in the second winding of said transformer in series with said second power distribution line; and stabilizing power distribution in the second power distribution line.

16. A process according to claim 15, wherein said transformer is a voltage support transformer.

17. A process according to claim 15, wherein said first power distribution line and said second power distribution line are single-phase lines.

18. A process according to claim 15, wherein said first power distribution line and said second power distribution line are three-phase lines.

19. A process according to claim 15, wherein said fault condition is an overcurrent condition, and said inducing step comprises increasing voltage and current in said second power distribution line.

* * * * *

UNITED STATES PATENT AND TRADEMARK OFFICE
CERTIFICATE OF CORRECTION

PATENT NO. : 5,895,979
DATED : April 20, 1999
INVENTOR(S) : Ljubomir A. Kojovic It is certified that error appears in the above-identified patent and that said Letters Patent is hereby corrected as shown below:

<u>Column 6,</u>
Line 66, rewrite Claim 7 as follows:
7. A power distribution network according to claim 1, further comprising a third power distribution line, a fourth power distribution line, and a second tranformer, said second transformer including first and second windings, said first and second lines being connected to said first and second loads, said third and fourth loads, said second transformer first winding being in series with said first and second lines, said second transformer second winding being in series with said third and fourth lines.

Signed and Sealed this

Sixth Day of April, 2004

JON W. DUDAS
*Acting Director of the United States Patent and Trademark Office*